United States Patent [19]
Ismail et al.

[11] Patent Number: 5,889,683
[45] Date of Patent: *Mar. 30, 1999

[54] METHOD AND APPARATUS FOR CONTINUOUS OIL MONITORING AND TREATMENT

[76] Inventors: Ashraf A. Ismail, 4162 Dorchester W., Apt.#7, Westmount, Canada, H3Z 1V1; Frederick R. Van De Voort, 96 St. Andrews, Baie D'urfe, Canada, H9X 2V1; David Pinchuk, 137 Radcliffe Road, Montreal West, Canada, H4X 1C1

[ * ] Notice: This patent issued on a continued prosecution application filed under 37 CFR 1.53(d), and is subject to the twenty year patent term provisions of 35 U.S.C. 154(a)(2).

[21] Appl. No.: 635,709

[22] Filed: Apr. 22, 1996

[51] Int. Cl.⁶ .............................. G01J 3/32; G01N 21/00
[52] U.S. Cl. ................. 364/528.07; 702/25; 364/528.06
[58] Field of Search ..................................... 364/498, 496, 364/497, 499, 500, 502, 510, 468.16, 479.09, 479.1, 528.01, 528.06, 528.07; 356/70, 326, 303, 440; 250/301, 338.1, 339.07, 339.08, 339.12, 340; 73/53.05, 53.01, 61.41, 61.43, 61.44, 863.41, 863.61; 436/164; 508/554; 702/25, 23

[56] References Cited

U.S. PATENT DOCUMENTS

| | | | |
|---|---|---|---|
| H1190 | 6/1993 | Cramer | 73/863.61 |
| 4,007,121 | 2/1977 | Holder et al. | 508/554 |
| 4,701,838 | 10/1987 | Swinkels et al. | 364/164 |
| 5,046,846 | 9/1991 | Ray et al. | 356/326 |
| 5,097,129 | 3/1992 | De Vries et al. | 250/338.1 |
| 5,407,830 | 4/1995 | Altman et al. | 436/55 |
| 5,438,420 | 8/1995 | Harwick et al. | 356/440 |
| 5,470,757 | 11/1995 | Gagnon et al. | 436/164 |
| 5,517,427 | 5/1996 | Joyce | 364/510 |
| 5,677,191 | 10/1997 | Truett | 250/339.08 X |

OTHER PUBLICATIONS

Ismail et al., "Rapid Quantitative Determination of Freen Fatty Acids in Fats and Oils by Fourier Transform Ifrared Spectroscopy" JAOCS, v. 70, n. 4, pp. 335–341 apr. 1993.

*Primary Examiner*—Melanie A. Kemper
*Attorney, Agent, or Firm*—Merek & Voorhees

[57] ABSTRACT

Disclosed herein is a method and apparatus for controlling and extending the performance of lubricating fluids, such as lubricating oils. The method comprises simultaneous detection of multiple additives and contaminant levels in the lubricating fluids and measured input of selected additives to the lubricating fluids. The additive and contaminants levels are simultaneously and quantitatively determined using a Fourier transform infrared (FTIR) spectrometer, and any drop in additive levels below pre-specified limits automatically triggers corrective action whereby a computer-controlled delivery system is employed to replenish the depleted additives. The system can also be employed to detect irreversible degradation of the lubricating fluids and direct the degraded fluids to a holding area where they may undergo treatment or disposal and add new fresh lubricating fluids. A data management station is programmed for monitoring the quality of the fluid and ensuring that the threshold values of additive levels are maintained at all times of operation.

5 Claims, 7 Drawing Sheets

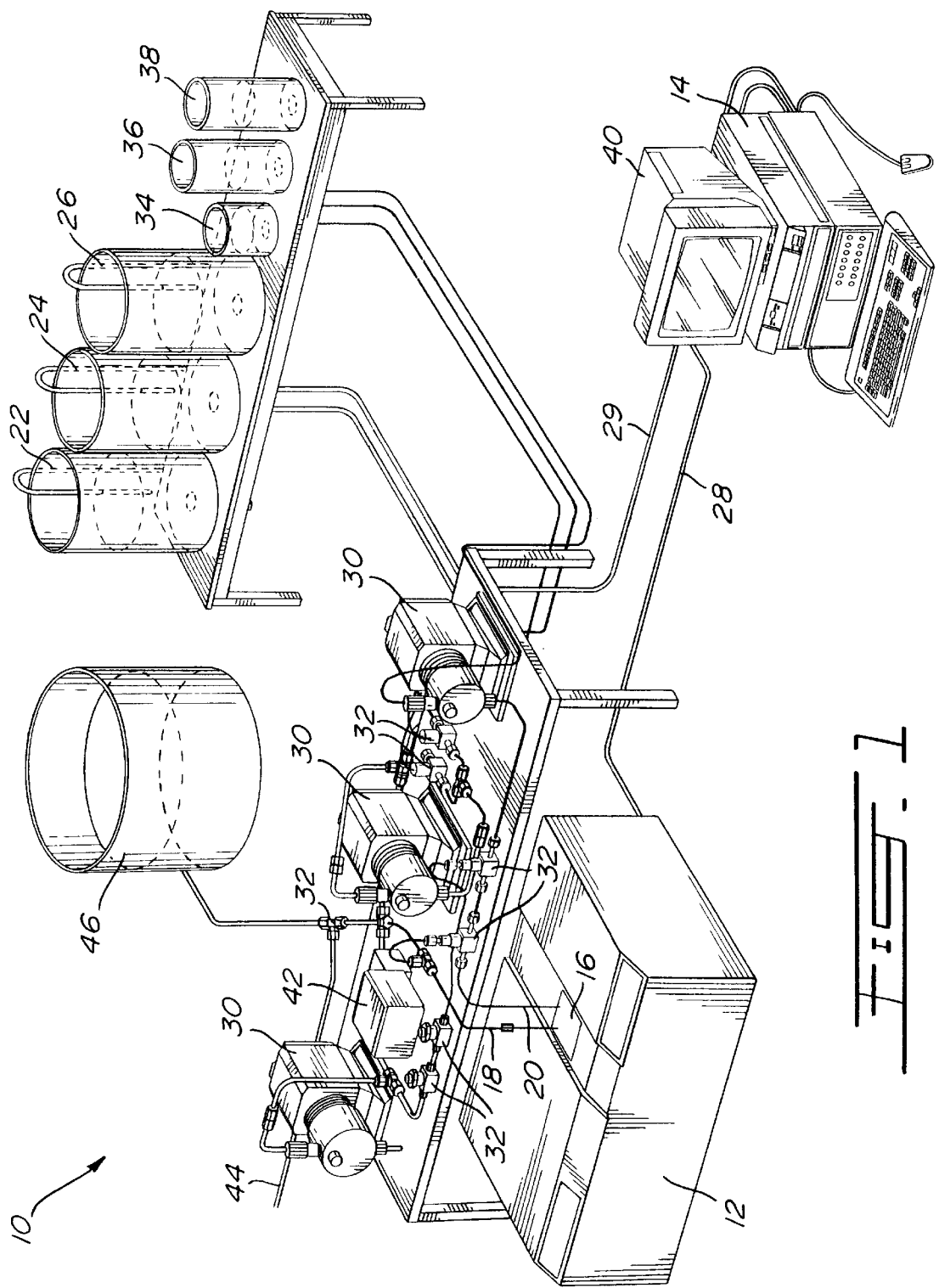

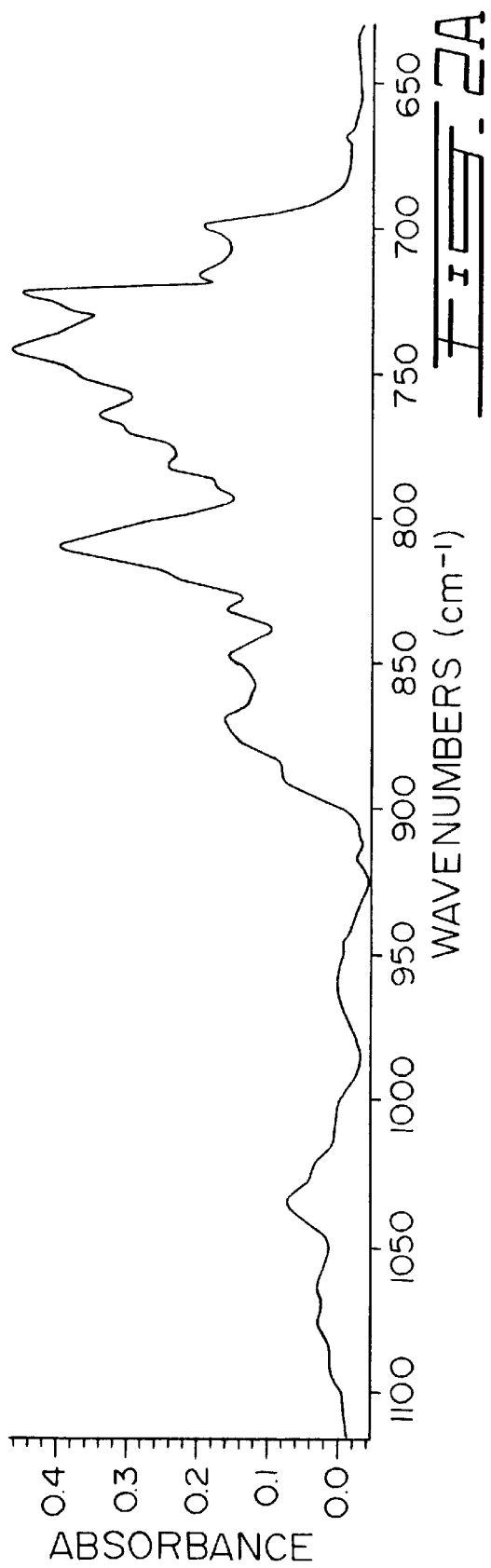
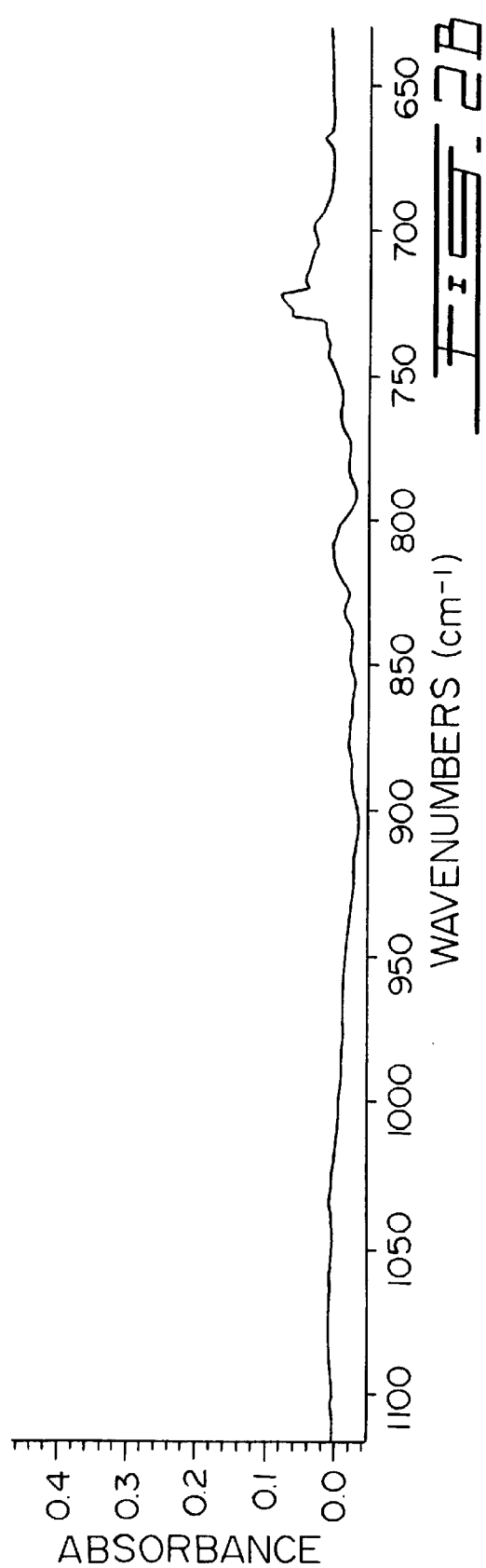
FIG. 2A
FIG. 2B

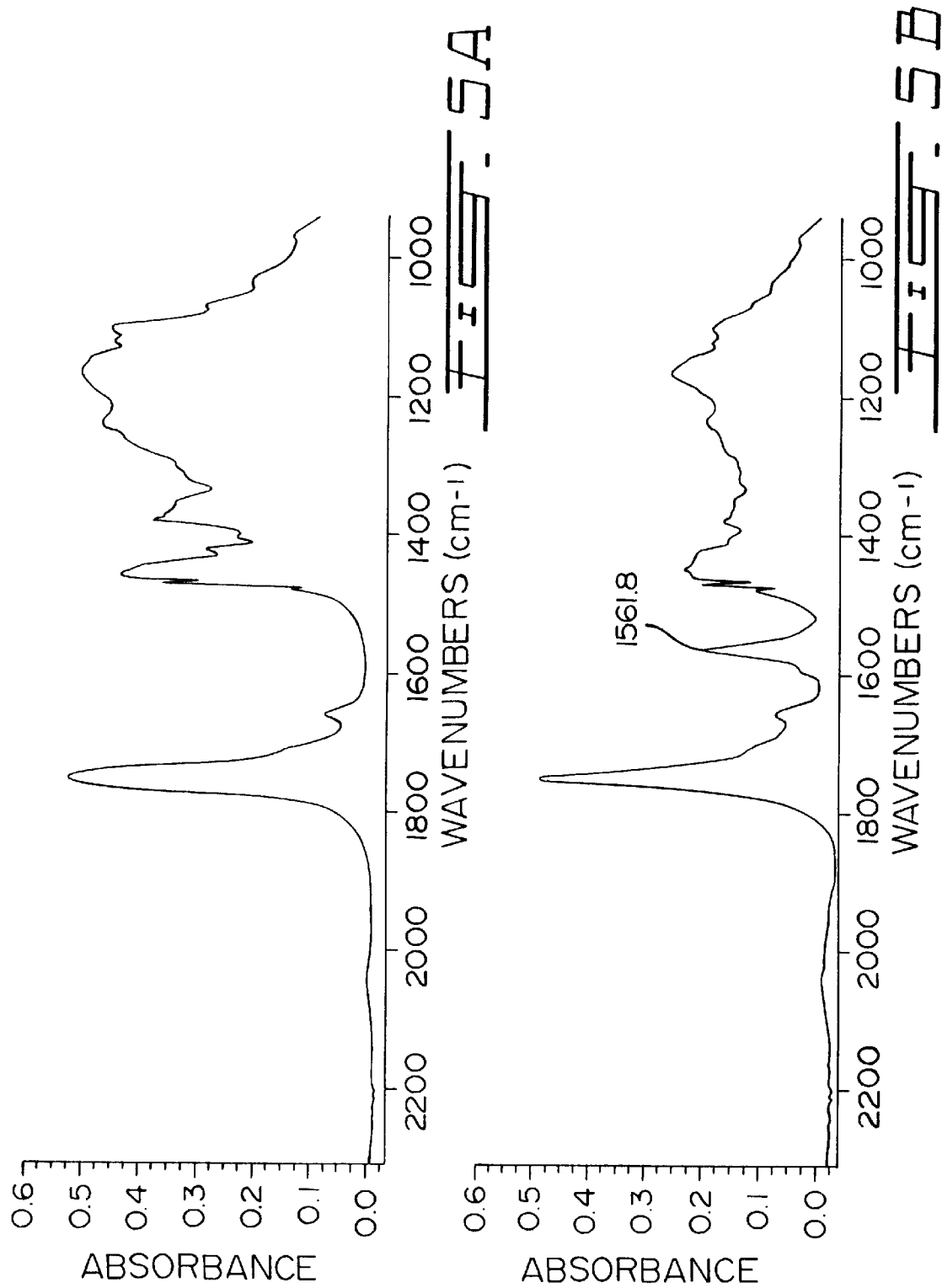

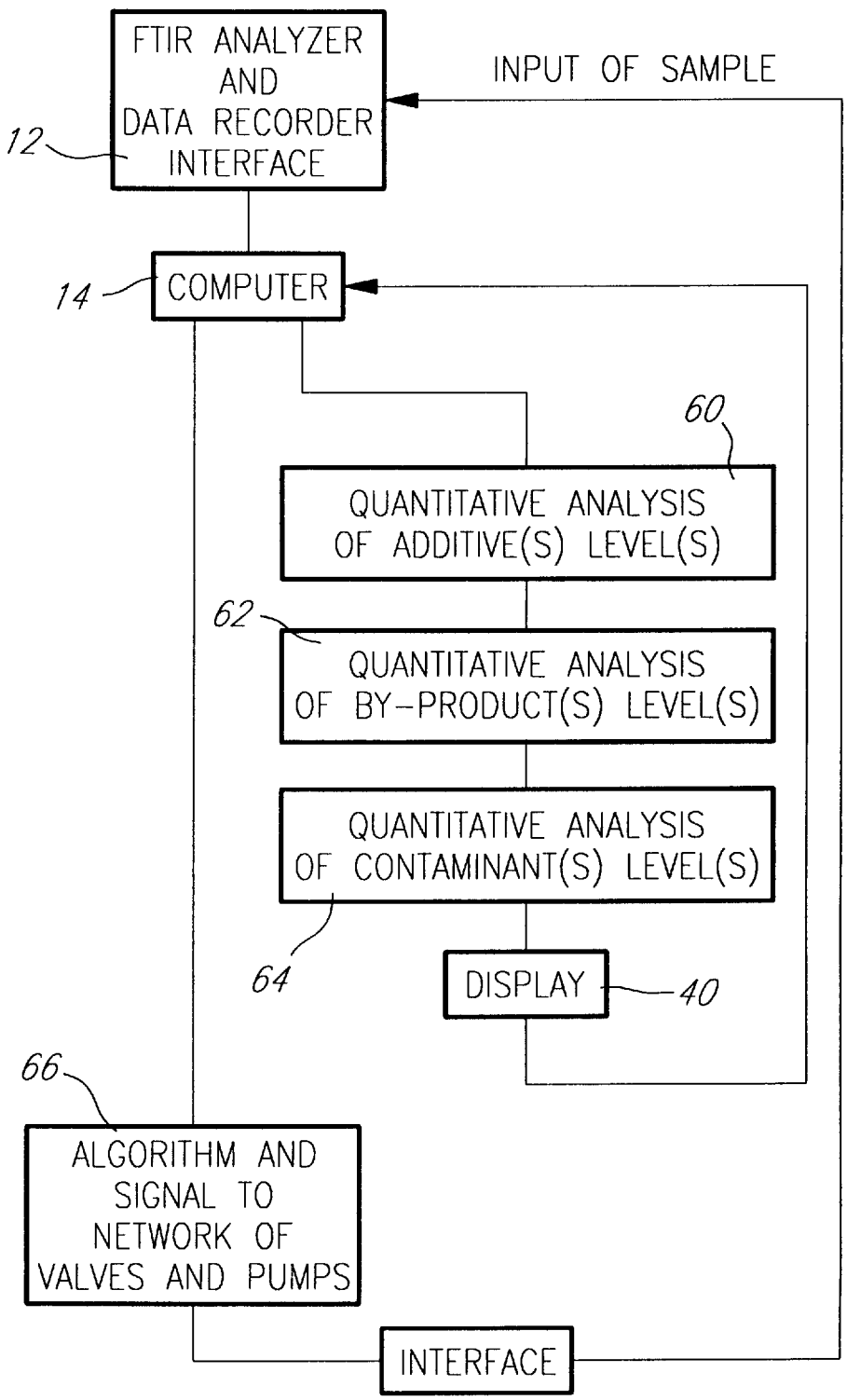

METHOD AND APPARATUS FOR CONTINUOUS OIL MONITORING AND TREATMENT

FIELD OF THE INVENTION

The present invention relates to the use of Infrared (IR) spectroscopy in a method and apparatus for the continuous monitoring of lubricating oils. More specifically, the present invention relates to the use of Fourier Transform Infrared (FTIR) spectroscopy.

FTIR spectroscopy, is a recent technological advance in infrared spectroscopy and is based on interferometry. In the chemical industry the development of FTIR spectroscopy has been cited as a major step forward that provides a new dimension of speed, precision and accuracy in infrared analysis. This is due to several advantages provided by FTIR technology including a dramatic improvement in signal-to-noise ratio, a significant reduction in scan time, higher energy throughput and superior spectral resolution and wavelength accuracy. Infrared of course refers to region of the electromagnetic spectrum including wavelengths from 0.78 to approximately 300 microns, in other words longer than visible light and shorter than microwave.

FTIR systems include on-line computer capabilities for custom, software-based, data handling routines and macro-command language programming facilities to automate routine operations. In addition, there is the capability to develop spectral libraries from which unknown compounds can readily be identified.

The development of FTIR technology has also substantially enhanced the utility and sensitivity of IR spectroscopy as a quantitative analysis tool. Multivariate data analysis techniques have been extensively developed to allow for the accurate quantitative analysis of highly complex mixtures. The application of these multivariate techniques allows for the determination of component concentrations, the detection of contaminants and the measurement of quality attributes in multi component systems.

It is known to quantitatively analyze the contents of lubricating oils by wet chemical analysis which among other drawbacks requires the taking of samples and the uses of various reagents to obtain results. Another obvious drawback is that wet chemical analysis in not performed in real time. Further drawbacks of wet chemical analysis will be apparent from the discussion below.

The present invention makes particular use of FTIR analysis for analyzing and correcting the contents of lubricating oils. The methods and appparatus of the present invention are advantageous over conventional method in at least two ways. Firstly, FTIR spectroscopy does not require any sample preparation and this eliminates the environmental concerns associated with wet chemical methods due to their use of organic solvents and hazardous reagents. Secondly total analysis time is greatly reduced when wet chemical method are replaced by FTIR methods in accordance with the present invention, as the average time required for an FTIR analysis is about 1–2 minutes per sample. As a result of these advantages, application of FTIR technology is a cost-effective approach to oil analysis in that no reagents are required and sample throughput is high. This, the higher fixed costs associated with the FTIR methods due to the cost of the instrumentation are rapidly offset with increasing number of samples analyzed. Furthermore, in accordance with the present invention FTIR analysis methods are fully automatable and suitable for rapid, on-line, real-time monitoring and treatment applications. In summary, important advantages of the present invention over traditional oil monitoring approaches is a reduction on the reliance on wet chemical methods of analysis, which are generally tedious, labor intensive and environmentally unfriendly in their own right.

Although it is known to use other systems involving FTIR spectroscopy, for example. U.S. Pat. Nos. 5,407,830 and 4,701,838, their use is restricted to specific applications unrelated to the present invention.

SUMMARY OF THE INVENTION

In general terms, the present invention provides a method and apparatus for controlling and extending the performance of lubricating oils, the method comprises simultaneous detection of multiple additives and contaminant levels in the lubricating oils and measured input of selected additives to the lubricating oils.

The additive and contaminants levels are simultaneously and quantitatively determined generally using a Fourier transform infrared (FTIR) spectrometer, and any drop in additive levels below pre-specified limits automatically triggers corrective action whereby a computer-controlled delivery system is employed to replenish the depleted additives.

However, in some embodiments, for example when detecting volatile contaminants, such as fuel present in lubricating oils, the objects of the present invention could be accomplished with a dispersive infrared spectrophotometer, a Fourier transform (FTIR) spectrometer, or filter-based infrared systems configured to measure at a specified frequency (or frequencies) characteristic of the volatile components(s).

In another aspect, the apparatus can also be employed to detect irreversible degradation of the lubricating oils and direct the degraded fluids to a holding area where they may undergo treatment or disposal. A data management station is programmed for monitoring the quality of the fluid and ensuring that the threshold values of additive levels are maintained at all times of operation.

One key role of the FTIR continuous monitoring and treatment system of the present invention is to extend the performance of the lubricating oil through continuous replenishment of additives that may become depleted in the lubricating oil and redirecting the lubricating oil to a holding area in the event that additive replenishment cannot maintain the performance of the lubricant.

The FTIR continuous monitoring and treatment apparatus preferably comprises an FTIR spectrometer, a flow-through infrared transmission cell or an attenuated total reflectance element or a fiber optic or fiber bundle adapted for recording an FTIR spectrum of the fluid before and after treatment, and additive reservoirs connected to the fluid circulating system through valves under computer control. Fluid transfer lines are utilized to bring a representative sample of the fluid to the FTIR system to record the FTIR spectrum in a continuous flow or at specified time intervals.

The FTIR system can also be used for selection of discrete regions or wavelengths in the infrared spectrum where the additive absorbs or breakdown products absorb. Changes at specific wavelengths or specified spectral regions may then be monitored by the use of infrared filters. The data output from the filter-based system may then be transferred to the data management system for additive replenishment or redirecting the fluid away to a holding reservoir when additive replenishment will not restore the fluid performance.

Thus the method of the present invention provides for the implementation of FTIR technology for on-line lubricant monitoring as well as automated replenishment of additives to extend lubricant service life, thereby reducing overall demands from limited natural resources, and concurrently, reducing the total amount of waste products finally disposed.

The present invention also enhances the possibilities for selected replacement of certain mineral lubricants with more environmentally friendly and readily biodegradable vegetable-based oils. Currently, biodegradable (vegetable-based) lubricants are in limited demand due to their inherent physical and chemical performance deficiencies, specifically, an accelerated fluid-component degradation at high temperatures and pressures. These unacceptable characteristics portray this category of lubrication as uneconomical and functionally undesirable. The present invention facilitates the introduction of biodegradable lubricant formulations for selected applications through its use in lubricant base and component screening and testing of lubricants formulated to meet the specifications of a particular application.

The information content inherent in the infrared spectrum of a lubricant includes information at the molecular level about the chemical composition of the fluid, the additives present, and the degradation products that may be generated as a result of breakdown of the fluid. In accordance with the present invention, data analysis software is used to control the level of the additives and breakdown products can be qualitatively and quantitatively. monitored in real time by FTIR spectroscopy. This information is of course important in deciding whether the fluid can perform its designated function.

For example, in the pulp and paper industry, the purge and replenishment of lubricating oils used in paper-making heavy machinery can be a time consuming and expensive task. Thus, the present invention is technically and financially advantageous when used to closely monitor and control the contents of the lubricating oil therefore extending its useful lifetime.

In addition, the coupling of the fluid status to a data management system that controls additive reservoirs which can deliver additives to replenish spent additive can provide significant benefit in the prolongation of fluid lifetime.

As mentioned above, in cases where irreversible contamination or degradation of the fluid cannot be offset by addition of performance enhancing additives, the fluid is directed to a holding or other treatment reservoir. This feature also provides the added benefit that contaminated fluid will not enter the operating environment of the fluid or mix with good fluid. The system can also be programmed to replenish the operating fluid with additional fresh fluid to offset the loss of fluid due to leakage or redirection of flow. Theses features provide significant savings in terms of decreasing the volume of non-usable fluid or decreasing the treatment time by decreasing the volume of treatable fluid. The programming of the data management and control system with the composition and optimum levels of additives and degradation profiles for different fluids enables the use of the apparatus of the present invention to monitor multiple reservoirs containing the same or different fluids each designated for the same or different functions.

In a preferred embodiment, the apparatus of the present invention is a fully portable and integrated unit which can be transported to the site of the lubricating fluids to be monitored and controlled. The portable unit could comprise various additive reservoirs. For example, the portable unit can be connected by appropriate hoses to the bleeding valve of a piece of heavy equipment or machinery containing lubricating fluids. Through other hoses, samples of lubricating fluids can be returned to the equipment or machinery and additives can be injected.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 1 is a schematic perspective view of the components of the apparatus in accordance with the present invention;

FIGS. 2a, 2b and 2c presents the plots of the spectra (absorbance vs. wavelength numbers) of Q-card sample substrates respectively, before and after exposure to vacuum, as well as the difference spectrum, showing the complete removal of the fuel from the sample;

FIGS. 5a, 5b show the spectrum of a vegetable oil spiked with oleic acid (10%) on a Q-card substrate and a P-card substrate, respectively, illustrating the spectral changes accompanying ionization of the acid;

FIG. 6 is a schematic flowchart of a preferred embodiment of a computer algorithm for controlling the flow of fluids through the apparatus of the present invention.

DETAILED DESCRIPTION

Figure 2C:
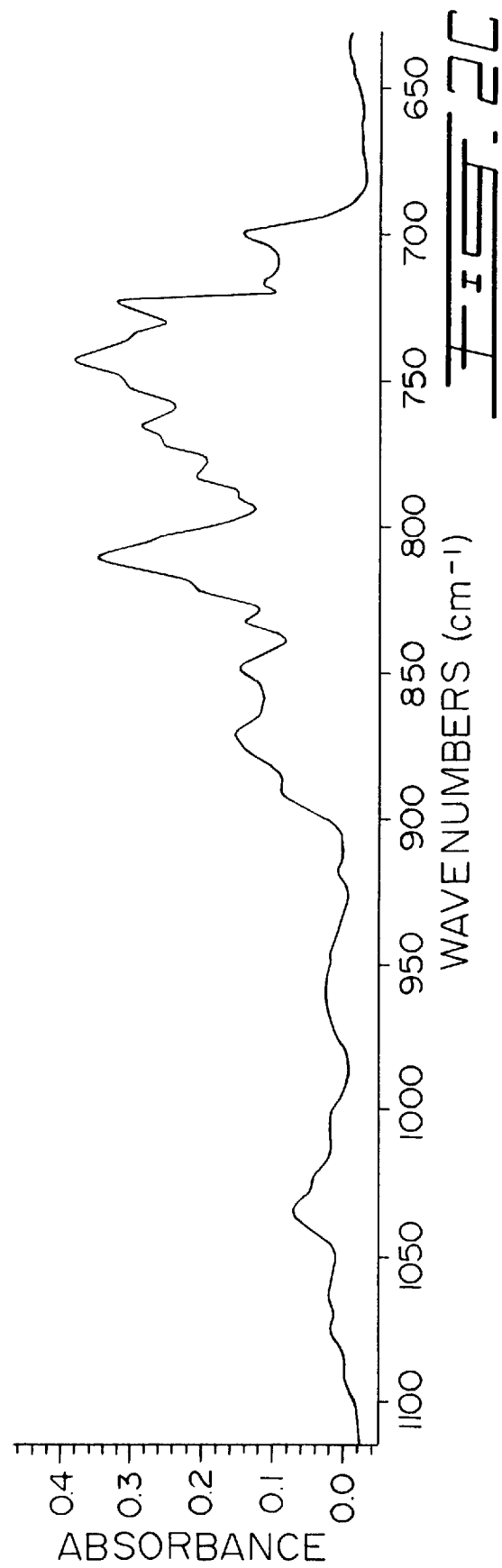

The method and apparatus of the present invention is designed to provide rapid, on-site assessment of lubricant quality, oxidative status of the oil, and additive (stabilizer) levels. The data provided by the monitoring system will allow immediate action to be taken to prevent the cascading effect of oil autoxidation, through the maintenance of optimal levels of key additives affecting lubricant stability under routine operating conditions. Depletion of individual performance additives (e.g., antioxidants) during the service life of any lubricating fluid contributes to the accelerated increase of destructive acids formed within the lubricant, therefore reducing overall lubricating efficiency. This may then lead to premature wear on machinery components and, if left unchecked, total equipment failure. Deterioration-entropy-limits the service life of lubricating fluids, and only through established analytical techniques (as indicated above) can performance qualities be monitored and fluid life extended.

Referring to FIG. 1, there is shown a schematic view of the major components of the apparatus 10 of the present invention. The major components and their operation is described below:

(1) FTIR Analyzer

An FTIR analyzer 12 preprogrammed for the automated analysis of lubricant oils. A complete and fully integrated software package controls data acquisition, measures key indicators of oil degradation and contamination, and measures levels of key additives. Analytical results are output to a printer to serve as a hard copy and communicated to a PC-type computer 14 for interpretation in accordance with operations software of the present invention.

(2) Sampling Device

The FTIR analyzer 12 is provided with a sampling device 16, consisting of a temperature-controlled infrared sampling cell (not shown) operatively connected to a sample input line 18 and a sample return line 20. The sample device 16 is a flow-through infrared cell placed in the Infrared beam and coupled to the lubricant reservoir through input line 18 and return line 20. Filters may be added to protect the flow-through sampling device from clogging with debris that may be present in the fluid naturally or as a result of fluid contamination. Fluid may be circulated through the flow-through sampling device 16 continuously or at specified timed intervals. The sample input line is selectively connected to sources of lubricating oils, schematically shown as reservoirs 22, 24, and 26 through appropriate connections. This allows on-line monitoring and analysis of the contents of lubricating oils or similar fluids which are fed through input and output lines 18 and 20, respectively. The sampling device 16 is specially constructed to withstand the rigorous operating conditions that are imposed by the nature of the monitoring system. Additional design considerations include optimization of cell pathlength, provision for removal of particulate matter from the sample prior to entry into the cell, and effective cleaning of the cell between samples. Thus samples of lubricating oils can enter the sampling device 16 and return to their source after analysis. A clean base fluid reservoir (not shown) is operatively connected to the flow-through cell to flush the sample from the flow-through cell. A bypass valve may be added to allowing flushing of the transfer lines 18 and 20 prior to introduction of a different sample of fluid for analysis.

(3) Remote Data Link and Instrument Control System

The system operations software controlling the apparatus of the present invention is programmed in a PC-type computer 14. Data from the FTIR analyzer 12 is sent to computer 14 via appropriate wires 28 or by optional wireless method. The data output from the FTIR analyzer 12 are integrated, interpreted, and compared by the software of the computer 14. This, in turn, automatically activates via cable 29 a microprocessor-controlled network of microprocessor-controlled precision chemical pumps 30 and logical, microprocessor-controlled, proportional solenoid valves 32 enabling the treatment of a fluid with precisely measured "doses" of pre-designated performance additives from additives supply tanks 34, 36, and 38. These "doses" will retard the depletion of targeted additives in "real time", i.e. immediately after computer 14, receives a signal from analyzer 12 that certain levels of additives in the sampled lubricating oil is lower than a pre-specified value. The computer 14 and the various components directed by the computer can be globally referred to as the remote data link and instrument control system.

More specifically, computer 14 is configured and loaded with a complete and fully developed software package integrated to receive the analytical data from the FTIR analyzer 12, interpret key indicators of oil degradation and contamination, and then recommend pre-programmed actions. Analytical results and recommended procedures are output to a color monitor 40 and a printer (not shown).

Information provided on the monitor 40 is color coded to indicate the status of the lubricant and course of action to be taken by the equipment operator, the option for totally automated operation is provided whereby the recommended actions are implemented automatically by transmission of appropriate signals to the key logical control units 42.

Referring now to FIG. 6, the software loaded in computer 14 will advantageously comprise:

(a) a calibration model or equation 60 to determine quantitatively or semi-quantitatively the status of all or selected additives from measurements of absorption at specified wavelengths or across signal or multiple spectral regions in the infrared spectrum;

(b) a calibration model or equation 62 to quantitatively or semi-quantitatively monitor the appearance and increase in the degradation by-products of fluids;

(c) a calibration model or equation 64 to quantitatively or semi-quantitatively monitor the appearance and increase in contaminants that may leak into the fluid from external sources;

(d) an algorithm 66 for controlling the opening and closing of the valves to draw samples into the FTIR analyzer 12, analyze the raw data provided by the FTIR analyzer 12, display human readable results and display recommend actions, optionally automate and implement the recommend actions, if necessary, replenish and additive or additives from additive reservoirs, maintaining the additive levels within predefined limits and if necessary divert the lubricating fluid to a holding reservoir and replace divert fluid with fresh fluid from a fluid replenishment reservoir.

The above described apparatus renders possible the continuous treatment of the source of lubricant being analyzed. Thus, in reaction to data concerning the state of the lubricant, additives can be dosed and the immediate result can be obtained by further FTIR spectrometer data taken by sample input line 18. The monitoring and treatment of the used oil is therefore accomplished in real-time.

Advantageously, the method and apparatus of the present invention will allow the detection of various contaminants from exterior sources that may infiltrate and contaminate the lubricating oil system being monitored. For example, the lubricating oil used by heavy equipment or machinery can become contaminated by water, glycol, sugar, and sand. Such contamination can usually be corrected through additive dosing. In a preferred embodiment of the invention, computer 14 will detect those contaminants and when any one or more contaminants reaches a predetermined level, computer 14 will direct the microprocessor-controlled logical valve network 32 to divert the flow of lubricating oil to discharge line 44 connected to an auxiliary device (not shown) for further processing (filtering, drying, centrifuging, retention, disposal, etc. ). This will allow to continue using the lubricating oil in the heavy equipment or machinery right up to the end of its useful service life and will then purge the spent oil to avoid damage to the equipment.

Thus, valve network 32 comprises a computer-controlled valve to redirect the contaminated or degraded fluid to a holding tank for the purpose of regeneration of the fluid by removing the contamination or degradation products or for disposal of the fluid. Valve network 32 further comprises a computer-controlled valve coupled to a reservoir 46 containing fresh fluid to replenish the fluid lost due to leakage or redirected elsewhere via discharge line 44.

It is important to note that apparatus 10 may be operatively connected to several sources of lubricating oils to conduct selective sampling, analysis and control measures. For example, apparatus 10 may be connected to three different machines which may be lubricated with totally different types of lubricants, e.g., hydraulic fluid, gear lube, compressor oil, etc. The total number of independent units connected to apparatus 10 of the present invention is limited, in fact, only by the requirement of physical proximity to the monitoring devices. In accordance with the present invention, sampling procedures and time intervals are preprogrammed and controlled by computer 14. After all relevant data is acquired, samples are returned to the appropriate lubricant reservoir automatically.

Once again, it is noted that apparatus 10 can be operatively connected to a plurality of additive reservoirs controlled by computer 14 to deliver precise doses for additives, alone or in combination. Computer 14 can also redirect the flow of the fluid to discharge line 44 if the fluid composition does not conform to performance specifications.

Accordingly, the method and apparatus of the present invention, through continuous, on-line, real time monitoring, will maximize lubricant life by allowing certain depleted lubricant additives to be replenished automatically from on-site additive reservoirs.

Effective use of the method and apparatus of the present invention will lead to significant prolongation of lubricant life, thereby minimizing the production of lubricant waste. Furthermore, regular on-site monitoring will minimize down time and incidence of equipment failure.

In brief, the apparatus of the present invention comprises an integrated FTIR spectrometer and computer system that continuously and automatically analyze a limited network of lubrication systems. The system is designed and programmed to recognize the type of deterioration taking place on-line and determine whether corrective action, in the form of "additive dosing" or "fluid diversion", must be taken to minimize contamination, degradation and/or additive depletion of the lubricating fluid. The necessary corrective actions are then performed automatically in accordance with the above described invention. Implementation of this technology provides users with the capability to monitor and treat their lubricating oils in real time, allowing a maximization of service life and extending the drain intervals of their lubricating oils, thereby reducing overall oil consumption and disposal costs.

The invention will now be further described in conjunction with specific examples provided below for illustrative purposes only:

EXAMPLE I

Continuous Monitoring and Replenishment of Antioxidant Levels in Thermally Stressed Synthetic Lubricants A synthetic lubricant formulation (P100, Thermal-Lube Inc.) was thermally stressed by heating in a reservoir at 175° C. The antioxidant level decreased with time as revealed by monitoring its characteristic absorption bank in the FTIR spectrum at 3650 cm$^{-1}$. When the antioxidant was allowed to become completely depleted, the base oil began to degrade, as evidenced by the appearance of a band in the FTIR spectrum in the region between 1800 and 1700 cm $^{-1}$, which is a carbonyl absorption characteristic of acidic degradation products.

To demonstrate the effectiveness of the method and apparatus of the present invention in maintaining the integrity of the oil, the apparatus of the present invention was programmed to maintain the antioxidant level between 80 and 100% of its initial value. This, lubricant was continuously pumped from the reservoir to a flow-through IR transmission cell (100-$\mu$m pathlength; KBr windows) situated in the sampling compartment of a standard FTIR spectrometer, equipped with a room temperature deuterated triglycine sulfate (DTGS) detector operating at ambient temperature. FTIR spectra of the lubricant were recorded by collecting 64 scans at 4 cm$^{-1}$ resolution and ratioed against the single-beam spectrum of the base oil to obtain an absorbance spectrum. The peak height of the bank at 3650 cm$^{-1}$ was measured relative to a baseline set between 3700 and 3200 cm$^{-1}$ was measured relative to a baseline set between 3700 and 3200 cm $^{-1}$. The peak height recorded was divided by the peak height measured in the spectrum of fresh lubricant and multiplied by 100 to give percent antioxidant remaining. Whenever this value fell below 80%, a fixed amount of antioxidant concentrate was automatically pumped into the lubricant reservoir. After a predefined interval, required to allow the additive concentrate to mix with the lubricant in the reservoir, collection of FTIR spectra resumed. The apparatus of the present invention thus maintained the level of antioxidant at between 80 and 100% of the optimum level at all times. The performance of the system was tracked over three-week intervals of continuous operation; throughout these tests, no oxidative breakdown of the base oil occurred, as evidenced by the absence of a carbonyl bank between 1800 and 1700 cm$^{-1}$ indicating that the lubricant integrity was maintained.

EXAMPLE II

Continuous Monitoring and Replenishment of Antioxidant Levels in Thermally Stressed Biodegradable-Based Lubricants A vegetable oil-based lubricant (BioD 100, Thermal Lube Inc.) was thermally stressed by heating in a reservoir at 95° C. The antioxidant level decreased with time as revealed by monitoring its characteristic absorption bank in the FTIR spectrum at 3650 cm$^{-1}$. When the antioxidant was allowed to become completely depleted, the base oil began to degrade, as evidenced by the appearance of a band in the FTIR spectrum in the region between 3448 and 3434 cm$^{-1}$, which is characteristic of the formation of hydro peroxide degradation products.

To demonstrate the effectiveness of the method and apparatus of the present invention in maintaining the integrity of the oil, the same procedure as described in Example I was followed. It was observed that as long as the antioxidant level was maintained at between 80% and 100% of the specified level, no oxidative breakdown of the base oil was detected as evidenced by the absence of hydro peroxide bands between 3448 and 3434 cm$^{-1}$, indicating that the lubricant integrity was maintained.

EXAMPLE III

Continuous Monitoring and Replenishment of Levels of an Antiwear Additive in Mechanically Stressed Lubricants A synthetic lubricant formulation (PX100, Thermal Lube Inc.) was mechanically stressed in a braking system. The level of antiwear additive was monitored by FTIR spectroscopy, depletion of the antiwear additive was observed to result in a change in the relative peak heights of bands at 1271 and 1121 cm$^{-1}$ in the FTIR spectrum signaling the need to add antiwear formulation to compensate for antiwear depletion. In a similar manner as described in Example I, the apparatus of the present invention was programmed to replenish the antiwear additive in the lubricant reservoir when its level dropped below 80% of the specified level, as determined by a calibration equation based on the relative heights of the 1271 and 1121 cm$^{-1}$ bands in the FTIR spectrum. The effectiveness of the method and apparatus of the present invention in extending the life of the lubricant was confirmed by measuring the viscosity of treated relative to untreated lubricant.

EXAMPLE IV

Quantitative Determination of Volatiles in Fuel-Contaminated Lubricants

Context

It is important to note that one of the most serious problems affecting the performance of diesel-powered electrical generators is the contamination of the lubricating fluid with fuel. A number of methods have been developed for estimating the extent of fuel contamination. It has also been proposed that infrared (IR) spectroscopy can be employed to measure the amount of fuel present in a lubricant. The current IR methods, however, are limited in that the quantitative determination of fuel contamination in lubricants is affected by changes in the infrared absorptions of the lubricant itself, changes in the fuel composition, and the presence of other co-contaminants such as soot, acids, and additives and additive-breakdown products. The use of a multi variate analysis approach for the treatment of the data to compensate for the above-mentioned confounding factors has met with limited success. Since the presence of fuels or any flammable volatiles in the lubricants can be extremely dangerous due to the possible ignition of the vapor, which can result in a fire or explosion of the generator, a simple and rapid method for the determination of fuel that is insensitive to the history of the sample would be highly desirable.

Application of the Present Invention

In the present invention, a method to quantitatively measure the amount of volatiles present in a lubricant sample has been developed which is insensitive to the amount of contamination or the history of the sample. In addition, the method requires a very small amount of sample, thereby minimizing disposal problems. The method involves the delivery of a sample of the lubricant onto a suitable porous IR-transmitting material or an attenuated total reflectance (ATR) crystal, collection of the IR spectrum, removal of volatiles under vacuum or in a stream of dry air or nitrogen, collection of a second IR spectrum, and isolation of the IR spectrum of the volatiles by taking the difference between the first and second spectra collected.

Experimental Protocol and Results

Ten micro liters of lubricant is delivered onto a disposable substrate for quantitative IR analysis having a fixed area and a fixed pathlength, designated hereinafter as a Q-card, such as, but not restricted to, a 3M IR card, type 61-100-12 (3M, St. Paul, Minn.). The IR spectrum of the Q-card to which the lubricant sample has been applied is record. The Q-card is placed in a stream of dry air or nitrogen or under vacuum of a fixed period of time in order to remove volatiles present in the lubricant sample, it may be simultaneously warmed to 40°–60° C. in order to accelerate the removal of the volatiles. The IR spectrum of the same Q-card is recorded again and then subtracted from the first IR spectrum recorded, yielding a third spectrum, termed the difference spectrum. The absorption bands in the difference spectrum are due to the volatile components that have been removed from the original sample in the volatilization step. The absorption bands in the difference spectrum can thus serve for the identification and/or quantitative determination of the volatile components.

To illustrate but not to limit the application of this new method of determination of volatiles in a sample, the determination of the amounts of fuel added to fresh and used lubricants is described. The lubricants employed were shown to be free of fuel contaminants by gas-chromatography. One-milliliter aliquots of the fuel-free lubricants were spiked with known amounts of the fuel (1–30% by weight). A 10-microliter aliquot was removed from each spiked sample and delivered onto a Q-card.

Figure 3:
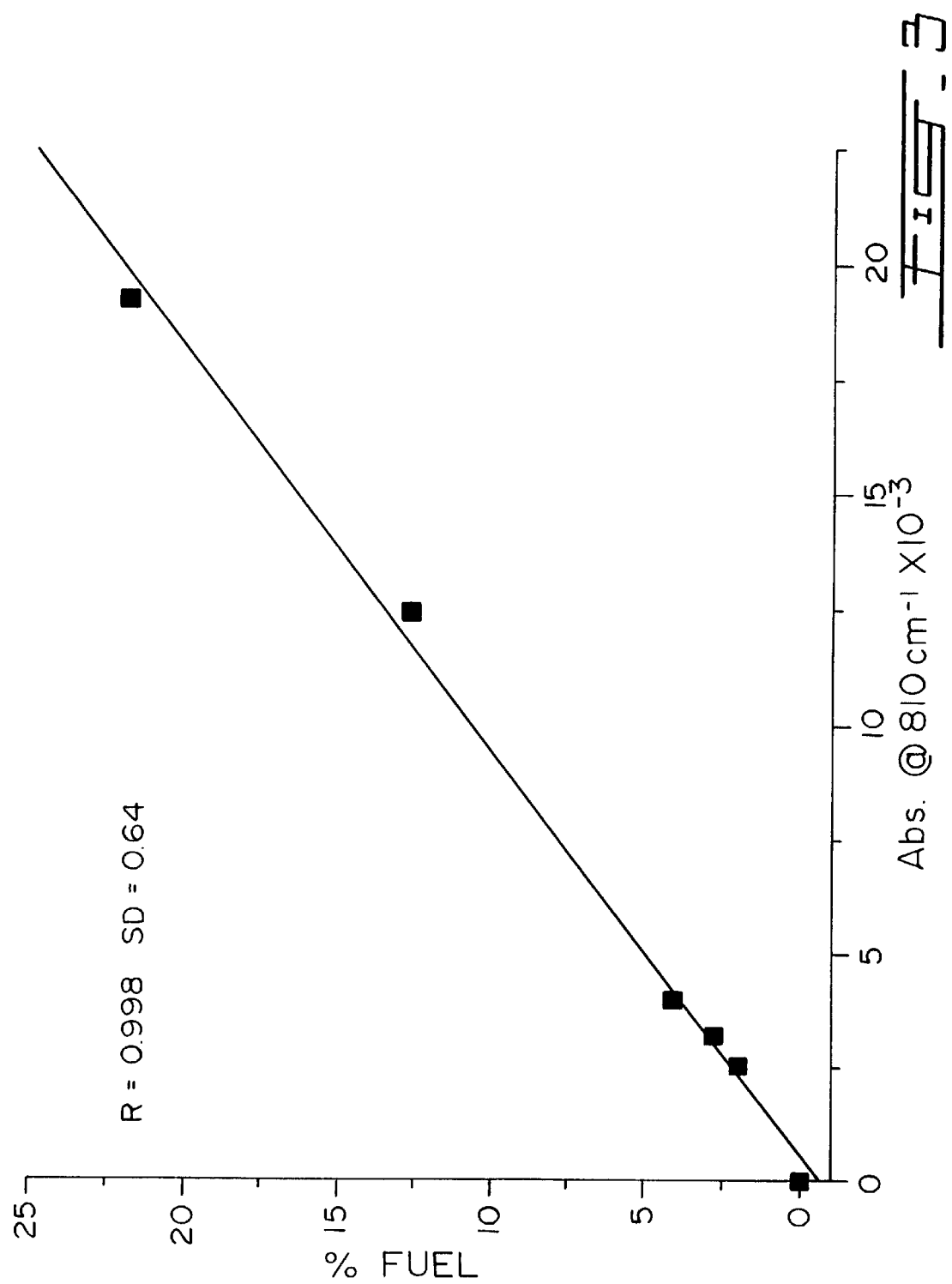
FIG. 3 shows a plot of the % fuel in the spiked samples versus the intensity of the band at ~810 $cm^1$ in the difference spectra obtained from a Q-card substrate to which the spiked samples had been applied.

The IR spectra of Q-cards containing the spiked samples were recorded. The Q-cards were then placed in a vacuum desiccator at room temperature for 1 hour. The infrared spectra of the Q-cards were then re-recorded, and the difference spectra were obtained. To demonstrate that the fuel is not volatilized from the Q-card before being subjected to vacuum, 10 micro liters of fuel was placed onto a Q-card, and the IR spectrum was recorded at 15-minute intervals over a period of 4 hours. No changes in the spectra recorded as a function of time were detected, demonstrating that the fuel is not volatilized from the Q-card at ambient temperature and pressure. The Q-card was then placed in a vacuum desiccator for 1 hour, and the IR spectrum was re-recorded. FIG. 2 presents the spectra of the Q-card before and after exposure to vacuum as well as the difference spectrum, showing the complete removal of the fuel from the Q-card. The spectrum of the fuel on the Q-card (top panel, FIG. 2) shows a number of absorption bands that may be used for quantitation of the amount of fuel in the sample, including a well-defined band at ~810 cm$^{-1}$. FIG. 3 shows a plot of the % fuel in the spiked samples versus the intensity of the band at ~810 cm$^{-1}$ in the difference spectra obtained form the Q-cards to which the spiked samples had been applied. The linearity of this plot (R=0.998) demonstrates the quantitative nature of the method.

The identity of the fuel contaminant can be ascertained by comparison of the difference spectrum obtained by this method to the infrared spectra of possible contaminating fuels. If the identity of the fuel is known or has been established in this manner, a calibration curve similar to that in FIG. 3 can be constructed and used for quantitative determination of the percent of fuel in contaminated lubricants.

This method can be employed to obtain the spectra of volatiles in oils or any other substance in a simple and efficient manner. It should also be noted that this method can be employed with a dispersive IR spectrophotometer, a Fourier transform (FTIR) spectrometer, or filter-based IR systems configured to measure at a specified frequency (or frequencies) characteristic of the volatile components(s).

EXAMPLE IV

Quantitative Determination of Total Acid Content in Lubricants by the Use of a Preconditioned Disposable Substrate of Quantitative IR Analysis Context The presence of organic acids in lubricants can be detrimental to the quality of lubricants as they are extremely corrosive and can attack the metal components of an engine. Organic acids can exist in an oil as monomers or dimers, depending on their concentration: at high concentration (~>0.05M), the dimer if favored. The monomer-dimer equilibrium complicates the determination of total acid content by IR spectroscopy. Ideally, it would be preferable to convert all the acid molecules present in a sample to a single form in a simple and efficient manner. This can be readily accomplished by the addition of base to convert the acids to the ionized form. The intensity of the characteristic IR absorption band of the ionized form of the acid [v(COO)] can then serve as the basis for quantitative determination of total acid content [A. A. Ismail, F. F. van de Voort, G. Emo, and J. Sedman, *J. Am. Oil Chem. Soc.* 70, 335–340 (1993)]. In the prior art, ionization of the acid was achieved by extraction of an oil with a 1% KOH/anhydrous methanol solution. The extract procedure consisted of adding KOH/anhydrous methanol to oil in a 1:1 ratio (w/w) in a 10 mL screw-capped test tube and shaking thoroughly for 1 min. The test tube was then centrifuged for 2 minutes in a benchtop centrifuge to ensure complete phase separation, and the upper methanol layer was pumped into an IR transmission flow cell.

Application of the Present Invention

In the present invention, the need for an extraction step is eliminated by the use of a porous IR-transmitting substrate such as, but not restricted to, a 3M IR card, type 61-100-12 (3M, St. Paul, Minn.), that has been preconditioned with a base. Such a porous substrate can be impregnated with any of a multitude of reagents that may react quantitatively with particular component(s) of interest present in a sample, said reaction resulting in the appearance of characteristic IR absorption bands that may facilitate quantitative analysis of the particular components(s) of interest. The use of such an impregnated porous IR-transmitting substrate, designated hereinafter as P-card, is illustrated by, but not limited in scope to the quantitative determination of total acid content in lubricants. In this specific instance of application of the P-card, the P-card is prepared by deposition of a 10-microliter aluquot of a 1–10% solution of KOH in methanol (or other appropriate solvent). The methanol is evaporated, leaving behind a fixed amount of KOH impregnated in the pores of the P-card. Upon deposition of an acid-containing lubricant on the P-card, the acid groups are ionized within several minutes. The IR spectrum is then recorded, and the acid content of the sample determined from the intensity of the $v(COO^-)$ absorption band.

Experimental Protocol

Figure 4:
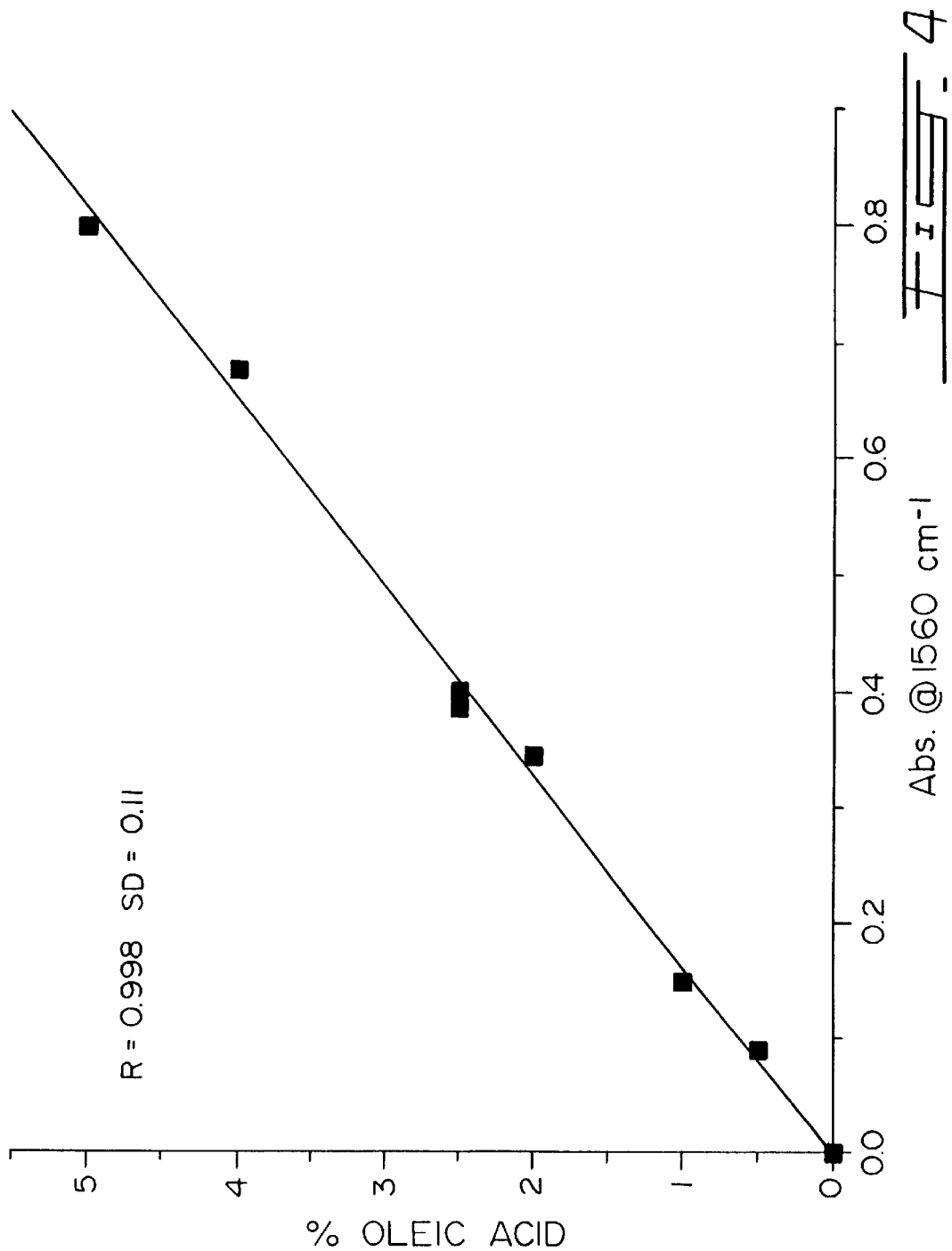
FIG. 4 shows a plot of the % oleic acid in the spiked samples versus the intensity of the band at ~1560 $cm^{-1}$ [v(COO)] in the spectra of a P-card substrate to which the spiked samples had been applied.

As an illustrative example, acid-free oil samples were spiked with known amounts of oleic acid ($C_{18}H_{33}COOH$) (1–5%). Ten-microliter aliquots of each oil sample were delivered onto P-cards which had been preconditioned with base. After a 1-min reaction time, the IR spectrum of the P-card was recorded. FIG. 4 shows a plot of the % oleic acid in the spiked samples versus the intensity of the band at ~1560 cm$^{-1}$ [$v(COO^-)$] in the spectra of the P-cards to which the spiked samples had been applied. The linearity of this plot (R=0.996) demonstrates the quantitative nature of the method.

This method has additional utility in the determination of the acid content of vegetable-based biodegradable lubricants as such oils are composed primarily of triglycerides, which exhibit an intense $v(C=O)$ absorption band at ~1745 cm$^{-1}$. The overlap of this band with the $v(C=O)$ absorption of fatty acid dimers at ~1711 cm$^{-1}$ is a complicating factor in the determination of total acid content in such oils. When an acid-containing oil is deposited onto the P-card preconditioned with base, ionization of the COOH groups gives rise to a $v(COO^-)$ absorption at 1560 cm$^{-1}$, well away from interfering absorptions. FIG. 5 shows the spectrum of a vegetable oil spiked with oleic acid (10%) on a Q-card and the P-card, respectively, illustrating the spectral changes accompanying ionization of the acid.

Although the invention has been described above with respect with one specific form, it will be evident to a person skilled in the art that it may be modified and refined in various ways. It is therefore wished to have it understood that the present invention should not be limited in scope, except by the terms of the following claims.

We claim:

1. A method for the quantitative determination of a plurality of specific components present in the composition of a lubricating fluid stream so as to prolong its service life by quantitatively detecting levels of each of said plurality various components rising above or falling below selected threshold parameters, said method comprising the steps of:

(a) sampling said lubricating fluid stream;

(b) loading said sample on a material selected from a porous IR-transmitting material previously impregnated with at least one reagent capable of reacting quantitatively with particular components of interest present in a sample and capable of shifting the infrared spectrum of said sample to avoid confusion with underlying spectra of other components present in the sample;

(c) placing said material loaded with a sample in a Fourier Transform Infrared spectrometer;

(d) generating signals representative of infrared spectra and shifted infrared spectra of each of said plurality of various components in said sample thereby providing information on the composition of each sample;

(e) sending said signals to a computer, said computer comprising a database of reference signals and being configured so as compare said signals with reference signals to generate response signals indicative of said composition and indicative of quantitative measurements of each component of interest in said sample; and (f) injecting additives in the lubricating fluid in response to the quantitative measurements obtained in step (e) so as to maintain the quantity of various components of interest within the selected threshold parameters thereby prolonging the service life of said lubricating fluid.

2. The method of claim 1 wherein said components of interest are contaminants and said method being adapted for the quantitative determination of total content of specific contaminants in a closed lubricating fluid system so as to prolong its service life by detecting levels of contaminants rising above selected threshold parameters and comprising the additional step of issuing an alarm signal in response to said threshold parameters being exceeded.

3. The method of claim 2 wherein said contaminants are organic acids.

4. The method of claim 3 comprising the additional step of ionizing each sample of lubricating fluid with a base so as to convert all organic acids present in said sample to the ionized form so as facilitate the determination of total content of organic acids.

5. The method of claim 1 further comprising after step (e) the additional intervening steps of removing the volatile components on each said sample loaded material, followed by placing each of the thus treated material loaded with a sample in a Fourier Transform Infrared spectrometer to generate further signals representative of infrared spectra of said sample without their volatile components so as to compare them to the respective signals generated for samples containing volatile components thereby providing a basis for determining the content of volatile components by comparison of signals representative of infrared spectra.

* * * * *